United States Patent
Benantar et al.

(10) Patent No.: US 6,895,510 B1
(45) Date of Patent: May 17, 2005

(54) MUTUAL INTERNET AUTHENTICATION BETWEEN A CLIENT AND SERVER UTILIZING A DUMMY IOP REQUEST

(75) Inventors: Messaoud Benantar, Austin, TX (US); Virgil Albaugh, Round Rock, TX (US); Liane Elizabeth Haybnes Acker, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 08/976,778

(22) Filed: Nov. 24, 1997

(51) Int. Cl.$^7$ .............................................. G06F 13/00
(52) U.S. Cl. ..................................................... 713/201
(58) Field of Search ............................... 713/201, 200; 709/225, 229; 380/23; 340/825.34

(56) References Cited

U.S. PATENT DOCUMENTS

| | | | |
|---|---|---|---|
| 5,367,635 A | 11/1994 | Bauer et al. ................. | 395/200 |
| 5,506,961 A | * 4/1996 | Carlson et al. ............. | 395/186 |
| 5,542,046 A | * 7/1996 | Carlson et al. ............. | 395/186 |
| 5,586,260 A | 12/1996 | Hu .............................. | 395/200 |
| 5,727,145 A | * 3/1998 | Nessett et al. .............. | 395/186 |
| 5,948,089 A | * 9/1999 | Wingard et al. ............. | 710/107 |
| 5,948,108 A | * 9/1999 | Lu et al. ........................ | 714/4 |

OTHER PUBLICATIONS

Orfali et al., "Essential Client/Server Survival Guide", Van Nostrand Reinhold, pp 105–128 and 147–160, Dec. 1994.*
Corbra Security, OMG Document No. 95–12–1, pp 1–40, 159–208, 259–280, 295–308, Dec. 1995.*

* cited by examiner

Primary Examiner—Robert W. Beausoliel, Jr.
Assistant Examiner—Stephen C. Elmore
(74) Attorney, Agent, or Firm—David A. Mims, Jr.; Dillion & Yudell LLP

(57) ABSTRACT

Mutual authentication between a client and server over the Internet utilizing the IOP protocol in its current state is enabled by first engaging in a "dummy" request when a client initiates a request to a new target server for the first time. This provides the means for creating a two way authentication mechanism. Rather than creating an object reference for the dummy request, the object reference at hand in the client, which the client is about to utilize for a request, is reused by extracting a proxy object from the request. The request is intercepted in the client and the proxy object passed to the interception method. The client next issues a two-way remote method already defined for the proxy object, such as the "non__existent( )" method defined on the CORBA object. The client then computes a security token, and sends the dummy request to the server. The server intercepts the dummy request, validates the security token received in the dummy request, and acquires a new authentication token to be returned to the client. Upon interception of the outgoing message, the new security token is marshalled in the security service context and sent to the client on the response message. The client intercepts the reply message and demarshals the security service context to recover the security token and complete mutual authentication.

20 Claims, 4 Drawing Sheets

MUTUAL INTERNET AUTHENTICATION BETWEEN A CLIENT AND SERVER UTILIZING A DUMMY IOP REQUEST

BACKGROUND OF THE INVENTION

1. Technical Field

The present invention relates in general to security and entity authentication in distributed object computing over the Internet and in particular to utilizing existing protocols for such security and entity authentication. Still more particularly, the present invention relates to utilizing the Internet Inter-ORB Protocol for security and entity authentication in distributed object computing over the Internet.

2. Description of the Related Art

The Internet Inter-ORB (Object Request Broker) Protocol (IOP), a standard protocol promulgated by the Object Management Group (OMG), is emerging as a leading technology for enabling distributed object computing over the Internet. Security, particularly authentication of interaction entity (client and server) identities in this environment is required for many applications, such as Internet commerce. Currently, however, the IOP protocol allows only for one-way authentication: only a server is able to authenticate the client. The protocol includes no provision for the client to authenticate the server. This functionality may be essential for an Internet transaction where a client is required, for example, to disclose a credit card number for a transaction to proceed. In such a circumstance, the client is better protected by verifying the authenticity of the server's identity before it engages with the server, thus achieving mutual authentication for the interacting entities.

It would be desirable, therefore, to provide a method and apparatus for mutual authentication of entities interacting over the Internet utilizing the IOP protocol. It would be advantageous, given the widespread industry implementation of the IOP protocol, if the method utilized the IOP protocol in its current state rather than redesigning the protocol. It would further be desirable for the solution to be applicable to every Object Request Broker (ORB) based on the IOP protocol.

SUMMARY OF THE INVENTION

It is therefore one object of the present invention to provide an improved method and apparatus for security and entity authentication in distributed object computing over the Internet.

It is another object of the present invention to provide an improved method and apparatus for utilizing existing protocols for security and entity authentication in distributed object computing over the Internet.

It is yet another object of the present invention to provide a method and apparatus for utilizing the Internet Inter-ORB Protocol for security and entity authentication in distributed object computing over the Internet.

The foregoing objects are achieved as is now described. Mutual authentication between a client and server over the Internet utilizing the IOP protocol in its current state is enabled by first engaging in a "dummy" request when a client initiates a request to a new target server for the first time. This provides the means for creating a two way authentication mechanism. Rather than creating an object reference for the dummy request, the object reference at hand in the client, which the client is about to utilize for a request, is reused by extracting a proxy object from the request. The request is intercepted in the client and the proxy object passed to the interception method. The client next issues a two-way remote method already defined for the proxy object, such as the "non_existent( )" method defined on the CORBA object. The client then computes a security token, and sends the dummy request to the server. The server intercepts the dummy request, validates the security token received in the dummy request, and acquires a new authentication token to be returned to the client. Upon interception of the outgoing message, the new security token is marshalled in the security service context and sent to the client on the response message. The client intercepts the reply message and demarshals the security service context to recover the security token and complete mutual authentication.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
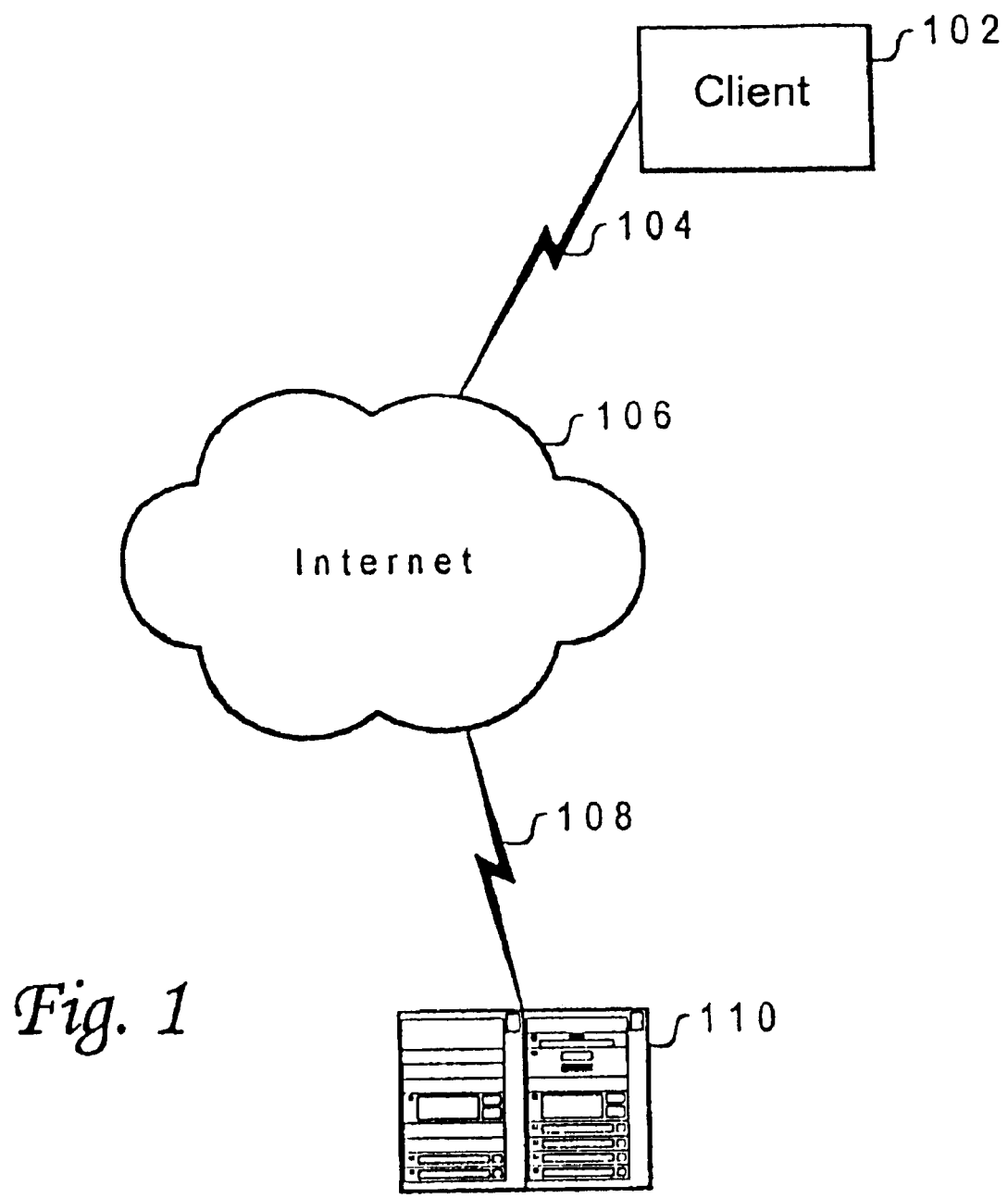
FIG. 1 depicts a network of data processing systems in which a preferred embodiment of the present invention may be implemented.

With reference now to the figures, and in particular with reference to FIG. 1, a network of data processing systems in which a preferred embodiment of the present invention may be implemented is depicted. The exemplary embodiment depicted includes a client 102 connected via communications link 104 to the Internet 106. Communications link 104 may, for example, be in the form of access provided indirectly by an Internet service provider (ISP) or directly via a proxy within a firewall, as is known in the art. Client 102 includes a Java-enabled browser application, allowing client 102 to retrieve and display information formatted in accordance with the HyperText Markup Language (HTML) and to run Java applets, or a Java interpreter, allowing client 102 to execute Java applications.

Also connected to Internet 106, via communications link 108, is server 110. Server 110 may be a World Wide Web (WWW, often simply referred to as "the Web") server capable of receiving and serving HyperText Transmission Protocol (HTTP) requests. Client 102 may thus retrieve HTML-formatted data from server 110 and display such information, executing Java applets in connection with such retrieval and/or display. Java applets thus executed may employ a mutual authentication process utilizing the IOP protocol in its present form.

Figure 2A:
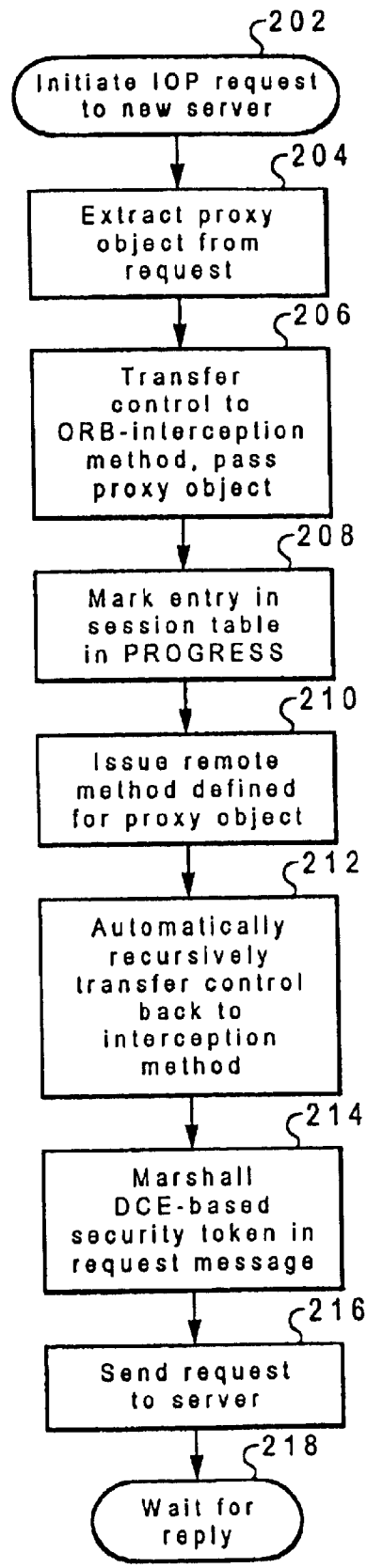
FIGS. 2A–2C are high level flowcharts for a process of mutual authentication of interacting entities over the Internet in accordance with a preferred embodiment of the present invention.
Figure 2B:
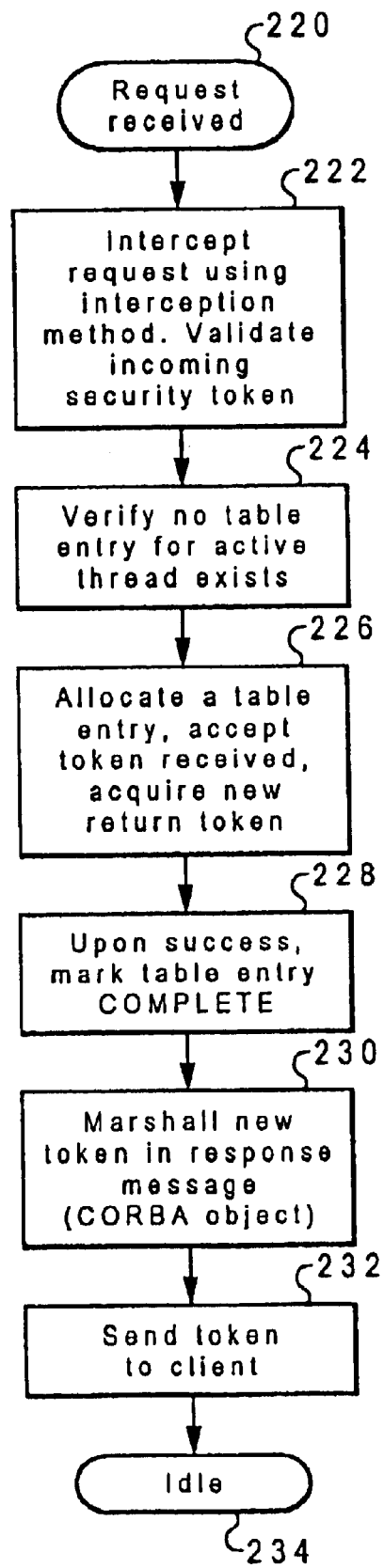
Figure 2C:
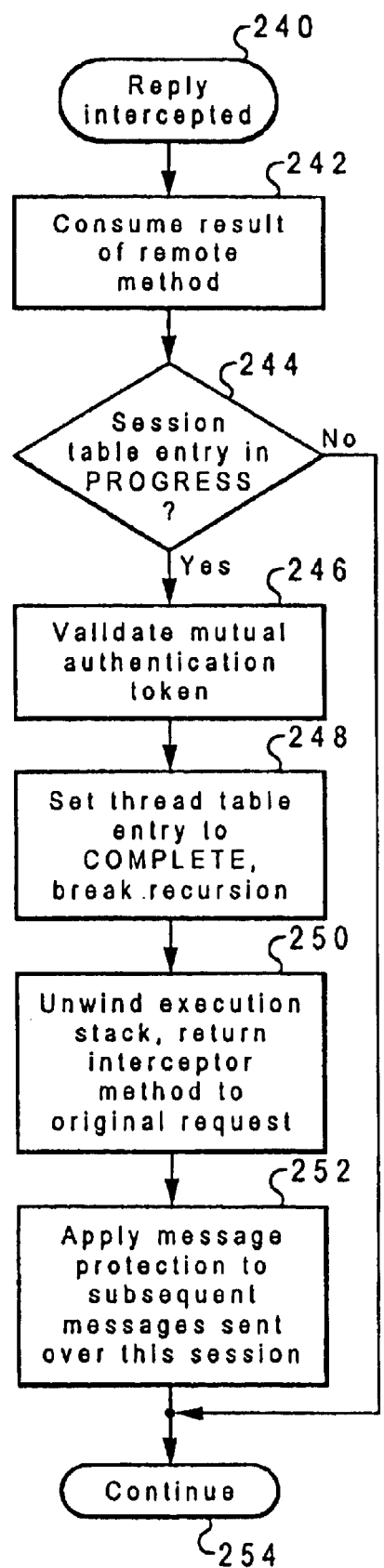

Referring to FIGS. 2A–2C, high level flowcharts for a process of mutual authentication of interacting entities over the Internet in accordance with a preferred embodiment of the present invention is illustrated. The process illustrated utilizes the IOP protocol in its current state. The process depicted is performed when a client first contacts a new server during a given session. Each time an authentication request is initiated to a new target server for the first time, the client is engaged in a two-way "dummy" request to that same server. Under that exchange, a vehicle is provided for a two-way authentication handshake. For this to occur, the client needs to utilize an object reference residing in the target server. Rather than create an object reference solely for this purpose, the object reference at hand—the one the client is about to use for its request—is reused. From within a security service Request Interceptor, the proxy object anchored from the Request is extracted.

FIG. 2A illustrates the portion of the process implemented within the client as it initiates authentication of a server. The process begins on the client side at step 202, which depicts initiating an IOP request to a new target server for the first time. The process next passes to step 204, which illustrates extracting the proxy object anchored from the request, then to step 206, which depicts transferring control to an Object Request Broker (ORB) interception method, such as client_unmarshalled_request (Request_ptr req), and passing the extracted proxy object to the interceptor method. The process passes next to step 208, which illustrates marking the entry within the session table corresponding to the thread security association as being in PROGRESS.

The process then passes to step 210, which depicts issuing a two-way remote method defined for the proxy object, using the same extracted proxy object passed to the interceptor method. The remote method issued should be a Common Object Request Broker Architecture (CORBA) object which is already defined for every proxy object, such as non_existent( ). The proxy object is the same one previously extracted from the request object at hand in the client. The process then passes to step 212, which illustrates automatically, recursively transferring control back to the same interception method already being executed.

The process next passes to step 214, which depicts marshalling a distributed computing environment (DCE) based security token in a request message. The process then passes to step 216, which illustrates sending the request to the server. The process next passes to step 218, which depicts waiting for a reply from the server.

FIG. 2B illustrates the portion of the process executed at the server in response to receiving the request from the client. The process begins at step 220, which depicts receiving the request sent by the client. The process next passes to step 222, which illustrates intercepting the request using, for example, the interception method target_demarshalled_request (Request_ptr request) and validating the incoming security token. The process passes then to step 224, which depicts verifying that no table entry corresponding to the active thread yet exists.

The process passes next to step 226, which illustrates allocating a session table entry and entering a mutual authentication handshake by accepting the token received in the request and acquiring a new authentication token to be sent back to the client. The process passes to step 228, which depicts marking, upon successful mutual authentication, the entry for the thread within the session table COMPLETE, and then to step 230, which illustrates marshalling the new security token in the reply message. The process then passes to step 232, which depicts sending the token to the client, and then to step 234, which illustrates the process becoming idle.

At this point a security token is returned to the client to complete a mutual authentication handshake. FIG. 2C illustrates the portion of the process implemented by the client upon intercepting the reply message. The process begins at step 240, which depicts intercepting the reply method in the request interceptor method, such as client_demarshalled_response (Request_ptr request). The process next passes to step 242, which illustrates the client thread consuming the result of the remote method, non_existent( ), without any side-effect.

The process then passes to step 244, which illustrates a determination of whether the session table entry for the active thread is in PROGRESS. If the session table entry status is verified, the process proceeds to step 246, which depicts validating the mutual authentication token in order to accomplish mutual authentication. The process then passes to step 248, which illustrates setting the session table entry for the thread to COMPLETE and breaking out of recursion. The process next passes to step 250, which depicts the execution stack unwinding and the interceptor method returning to the point at which the original request was being processed, and then to step 252, which illustrates applying message protection to subsequent messages sent over the present session. The process finally passes to step 254, which depicts the transaction between the client and server continuing. Referring momentarily back to step 244, if the session table entry for the active thread was set to COMPLETE, the process proceeds directly from step 244 to step 254.

The present invention permits mutual authentication of entities interacting over the Internet utilizing the IOP protocol in its current state rather than redesigning the protocol. The solution implemented by the present invention is applicable to every Object Request Broker (ORB) based on the IOP protocol, and does not require a new Object Reference to perform the "dummy" request that enables the mutual authentication handshake.

It is important to note that while the present invention has been described in the context of a fully functional data processing system, those skilled in the art will appreciate that the mechanism of the present invention is capable of being distributed in the form of a computer readable medium of instructions in a variety of forms, and that the present invention applies equally regardless of the particular type of signal bearing media used to actually carry out the distribution. Examples of computer readable media include: recordable type media such as floppy disks and CD-ROMs and transmission type media such as digital and analog communication links.

While the invention has been particularly shown and described with reference to a preferred embodiment, it will be understood by those skilled in the art that various changes in form and detail may be made therein without departing from the spirit and scope of the invention.

What is claimed is:

1. A method of mutually authenticating entities interacting over the Internet, comprising:

acquiring a security token in a client;

issuing a dummy IOP request containing the security token from the client to a server;

validating the security token in the server;

acquiring a new security token in the server;

issuing a response containing the new security token from the server to the client; and validating the new security token in the client.

2. The method of claim 1, further comprising:

determining that an IOP request from the client to the server is a first request for a given session from the client to the server.

3. The method of claim 2, further comprising:

extracting a proxy object from the first request;

passing the proxy object to an interception process acquiring the security token within the client; and issuing a two-way remote method defined for the proxy object.

4. The method of claim 3, further comprising:

automatically, recursively transferring session control in the client to the interception method while awaiting a response front the server.

5. The method of claim 3, further comprising:

upon receiving a response from the server, consuming a result of the two-way remote method.

6. The method of claim 1, further comprising:

marshalling the new security token in the response, wherein the response is a CORBA object.

7. The method of claim 1, further comprising:

upon validation of the security token in the server, verifying that no table entry exists for an active thread for mutual authentication between the client and the server;

allocating a table entry for the active thread; and upon successfully acquiring the new security token, marking the table entry for the active thread complete.

8. The method of claim 1, further comprising:

upon receiving a response from the server, verifying that a session table entry for the remote method is marked in progress.

9. The method of claim 1, further comprising:

after validating the new security token contained in the response, setting a session table entry for the remote method to a complete status and breaking a recursive transfer of session control to an interception process in the client.

10. A mutual authentication mechanism for entities interacting over the Internet, comprising:

a client;

a server; and a communications link between the client and the server;

a first security token acquired by the client and contained within a dummy IOP request issued by the client to the server over the communications link;

means within the server for validating the first security token;

a second security token acquired by the server and contained within a response issued by the server to the client over the communications link; and means within the client for validating the second security token.

11. The mechanism of claim 10, further comprising:

means within the client for determining whether a request to the server is a first request from the client to the server.

12. The mechanism of claim 11, further comprising:

extraction means within the client for extracting a proxy object from the first request;

passing means within the client for passing the proxy object to an interception method acquiring the first security-token within the client; and issue means within the client for issuing a two-way remote method defined for the proxy object to the server.

13. A computer program product in a computer usable medium for mutually authenticating entities interacting over the Internet, comprising:

instructions within the computer usable medium for acquiring a security token in a client;

instructions within the computer usable medium for issuing a dummy IOP request containing the security token from the client to a server;

instructions within the computer usable medium for validating the security token in the server;

instructions within the computer usable medium for acquiring a new security token in the server;

instructions within the computer usable medium for issuing a response containing the new security token from the server to the client; and instructions within the computer usable medium for validating the new security token in the client.

14. The computer program product of claim 13, further comprising:

instructions within the computer usable medium for determining that an IOP request from the client to the server is a first request for a given session from the client to the server.

15. The computer program product of claim 14, further comprising:

instructions within the computer usable medium for extracting a proxy object from the first request;

instructions within the computer usable medium for passing the proxy object to an interception method acquiring the security token within the client; and instructions within the computer usable medium for issuing a two-way remote method defined for the proxy object.

16. The computer program product of claim 15, further comprising:

instructions within the computer usable medium for automatically, recursively transferring session control in the client to the interception method while awaiting a response from the server.

17. The computer program product of claim 15, further comprising:

instructions within the computer usable medium for marshalling the new security token in the response, wherein the response is a CORBA object.

18. The computer program product of claim 13, further comprising:

instructions within the computer usable medium for verifying that no table entry exists for an active thread for mutual authentication between the client and the server upon validation of the security token in the server;

instructions within the computer usable medium for allocating a table entry for the active thread; and instructions within the computer usable medium for marking the table entry for the active thread complete upon successfully acquiring the new security token.

19. The computer program product of claim 13, further comprising:

instructions within the computer usable medium for verifying that a session table entry for the remote method is marked in progress upon receiving a response from the server.

20. The computer program product of claim 13, further comprising:

instructions within the computer usable medium for setting a session table entry for the remote method to a complete status after validating the new security token contained in the response and breaking a recursive transfer of session control to an interception process in the client.

* * * * *